United States Patent
Li et al.

(10) Patent No.: US 11,082,996 B2
(45) Date of Patent: Aug. 3, 2021

(54) DATA TRANSMITTING METHOD AND APPARATUS

(71) Applicant: Samsung Electronics Co., Ltd., Gyeonggi-do (KR)

(72) Inventors: Yingyang Li, Beijing (CN); Shichang Zhang, Beijing (CN); Yi Wang, Beijing (CN)

(73) Assignee: Samsung Electronics Co., Ltd.

( * ) Notice: Subject to any disclaimer, the term of this patent is extended or adjusted under 35 U.S.C. 154(b) by 5 days.

(21) Appl. No.: 16/328,167

(22) PCT Filed: Aug. 3, 2017

(86) PCT No.: PCT/KR2017/008380
§ 371 (c)(1),
(2) Date: Feb. 25, 2019

(87) PCT Pub. No.: WO2018/038416
PCT Pub. Date: Mar. 1, 2018

(65) Prior Publication Data
US 2019/0200377 A1    Jun. 27, 2019

(30) Foreign Application Priority Data

| Aug. 25, 2016 | (CN) | ......................... | 201610727924.0 |
| Sep. 5, 2016  | (CN) | ......................... | 201610803897.0 |
| Sep. 22, 2016 | (CN) | ......................... | 201610842911.8 |

(51) Int. Cl.
*H04W 4/00* (2018.01)
*H04W 72/12* (2009.01)
(Continued)

(52) U.S. Cl.
CPC ......... *H04W 72/1263* (2013.01); *H04J 13/00* (2013.01); *H04L 1/00* (2013.01);
(Continued)

(58) Field of Classification Search
CPC ..................................................... H04L 5/0033
See application file for complete search history.

(56) References Cited

U.S. PATENT DOCUMENTS 10,820,318 B2 * 10/2020 Kishiyama ............ H04L 5/0048
10,868,653 B2 * 12/2020 Iyer ...................... H04B 7/0617
(Continued)

FOREIGN PATENT DOCUMENTS

| CN | 102300313 | 12/2011 |
| CN | 104471886 | 3/2015 |

(Continued)

OTHER PUBLICATIONS

European Search Report dated Jul. 19, 2019 issued in counterpart application No. 17843836.2-1219, 12 pages.
(Continued)

*Primary Examiner* — Guang W Li
(74) *Attorney, Agent, or Firm* — The Farrell Law Firm, P.C.

(57) ABSTRACT

The present disclosure provides a data transmitting method. The method includes that a device detects SA, generates a DMRS sequence and a scrambling code of a data channel for the SA correctly decoded; and performs processing for the data channel scheduled by the SA correctly decoded according to the DMRS sequence and the scrambling code. According to the method of the present disclosure, DMRS sequence randomization and scrambling code randomization of the data channel can be better supported, so as to optimize transmission performance.

20 Claims, 5 Drawing Sheets

(51) Int. Cl.
| | |
|---|---|
| *H04L 1/00* | (2006.01) |
| *H04J 13/00* | (2011.01) |
| *H04L 5/00* | (2006.01) |
| *H04L 27/26* | (2006.01) |
| *H04W 4/40* | (2018.01) |
| *G06F 17/13* | (2006.01) |

(52) U.S. Cl.
CPC .......... *H04L 1/0061* (2013.01); *H04L 5/0007* (2013.01); *H04L 5/0016* (2013.01); *H04L 5/0033* (2013.01); *H04L 5/0051* (2013.01); *H04L 5/0091* (2013.01); *H04L 27/2613* (2013.01); *H04W 72/12* (2013.01); *H04W 72/1278* (2013.01); *G06F 17/13* (2013.01); *H04L 5/0082* (2013.01); *H04W 4/40* (2018.02)

(56) References Cited

U.S. PATENT DOCUMENTS

| | | | |
|---|---|---|---|
| 2013/0114547 A1 | 5/2013 | Li et al. | |
| 2013/0201942 A1 | 8/2013 | Kim et al. | |
| 2013/0315212 A1 | 11/2013 | Sorrentino | |
| 2015/0023282 A1* | 1/2015 | Aiba | H04L 1/0072 370/329 |
| 2015/0078279 A1* | 3/2015 | Ko | H04W 52/242 370/329 |
| 2015/0270938 A1* | 9/2015 | Noh | H04J 13/0074 370/329 |
| 2015/0326362 A1* | 11/2015 | Xiong | H04W 4/70 370/336 |
| 2015/0327288 A1* | 11/2015 | Park | H04W 52/04 370/329 |
| 2016/0023282 A1 | 1/2016 | Ramesh | |
| 2016/0044665 A1 | 2/2016 | Novlan et al. | |
| 2016/0135240 A1 | 5/2016 | Yoon | |
| 2016/0205674 A1 | 7/2016 | Zhang et al. | |
| 2016/0255647 A1 | 9/2016 | Zhu et al. | |
| 2018/0007529 A1* | 1/2018 | Shin | H04J 11/00 |
| 2018/0279258 A1* | 9/2018 | Yasukawa | H04L 5/0044 |
| 2018/0323917 A1* | 11/2018 | Um | H04W 16/14 |
| 2019/0097751 A1* | 3/2019 | Li | H04J 13/0062 |
| 2020/0037306 A1* | 1/2020 | Seo | H04W 72/0446 |
| 2020/0136690 A1* | 4/2020 | Noh | H04L 5/0037 |

FOREIGN PATENT DOCUMENTS

| | | |
|---|---|---|
| CN | 104812057 | 7/2015 |
| CN | 105594282 | 5/2016 |
| GB | 2534786 | 8/2016 |
| WO | WO 2013/010305 | 1/2013 |
| WO | WO 2016/921967 | 2/2016 |

OTHER PUBLICATIONS

PCT/ISA/210 Search Report issued on PCT/KR2017/008380, pp. 3.
PCT/ISA/237 Written Opinion issued on PCT/KR2017/008380, pp. 5.
Samsung, R1-166713, 3GPP TSG RAN WG1 #86, Gothenburg, Sweden Aug. 13, 2016, Remaining details on DMRS, pp. 5.
LG Electronics, R1-166823, 3GPP TSG RAN WG1 Meeting #86, Gothenburg, Sweden, Aug. 13, 2016, Remaining issues on physical layer structure for PC5-based V2V, pp. 4.
LG Electronics, R1-164517, 3GPP TSG RAN WG1 Meeting #85, Nanjing, China, May 13, 2016, Discussion on details of scheduling assignment for PC5 based V2V, pp. 6.
Nokia , Alcatel-Lucent Shanghai Bell, R1-165046, 3GPP TSG RAN WG1 Meeting #85, Nanjing, China, May 12, 2016, On SCI Contents, pp. 8.
CN Supplementary Search Report dated Jan. 4, 2021 issued in counterpart application No. 201710325997.1, 4 pages.
EP Intention to Grant dated Feb. 19, 2021 issued in counterpart application No. 17843836.2-1205, 40 pages.

* cited by examiner

[Fig. 1]
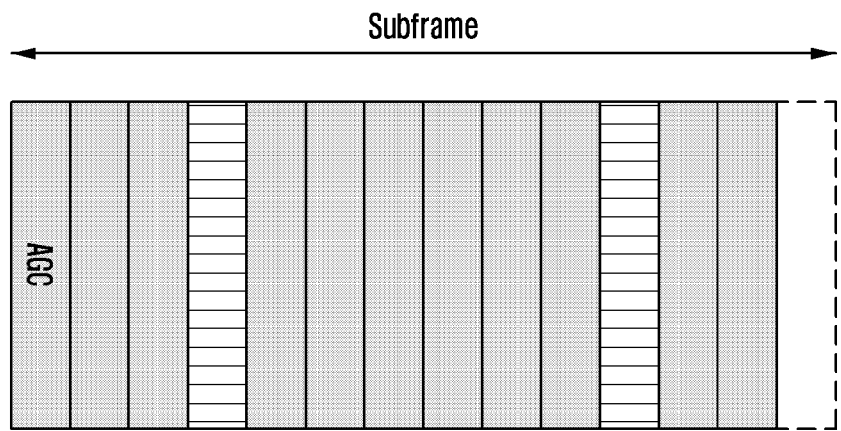
[Fig. 2]
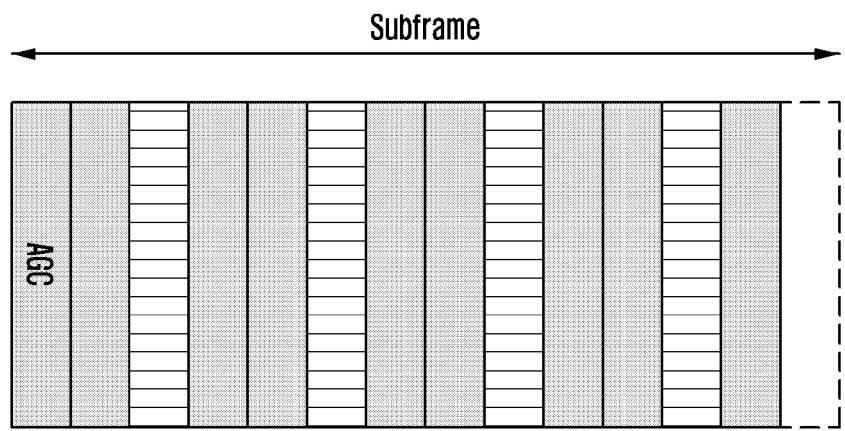

[Fig. 3]
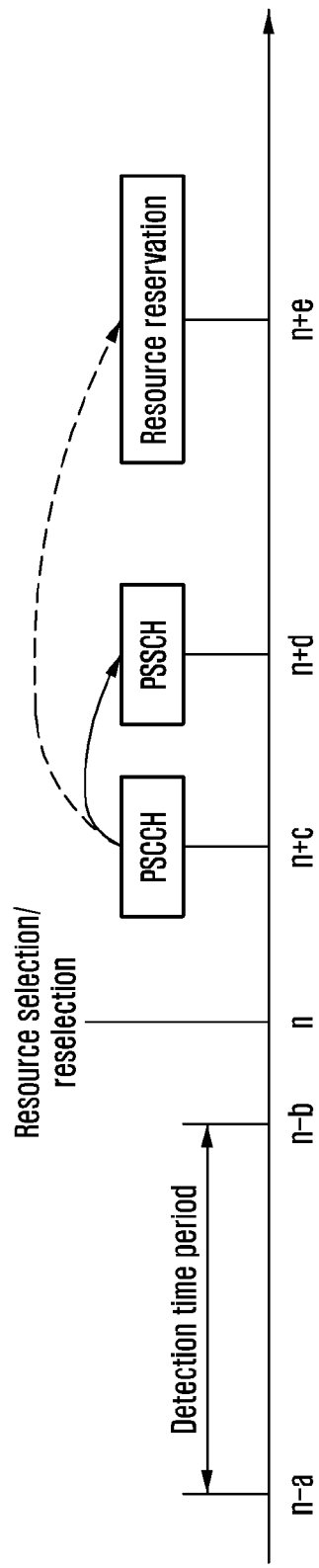

[Fig. 4]
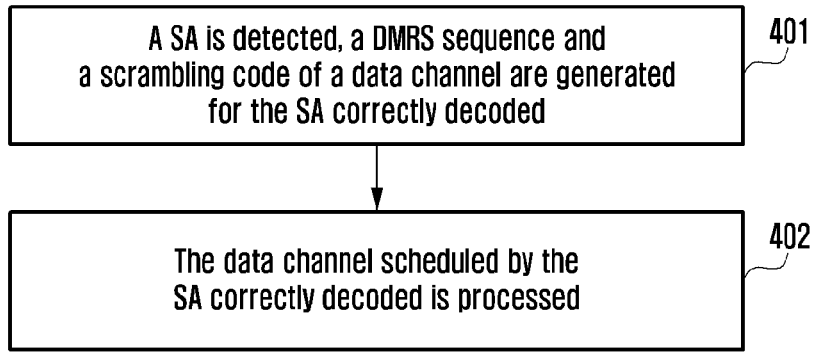
[Fig. 5]
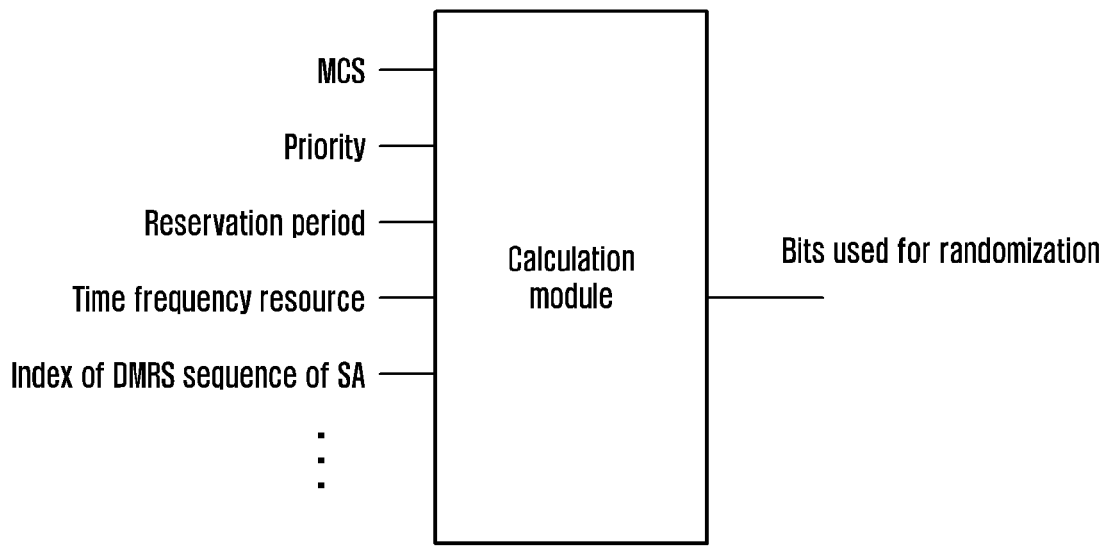
[Fig. 6]
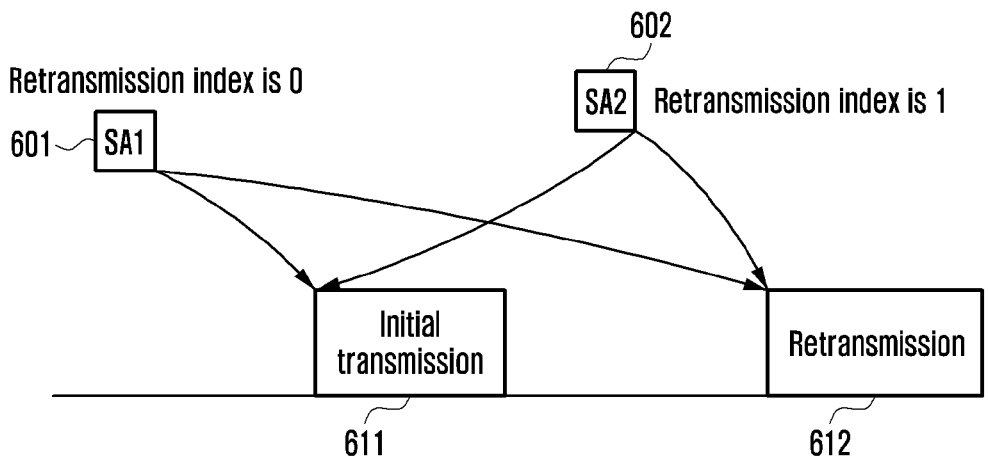

[Fig. 7]
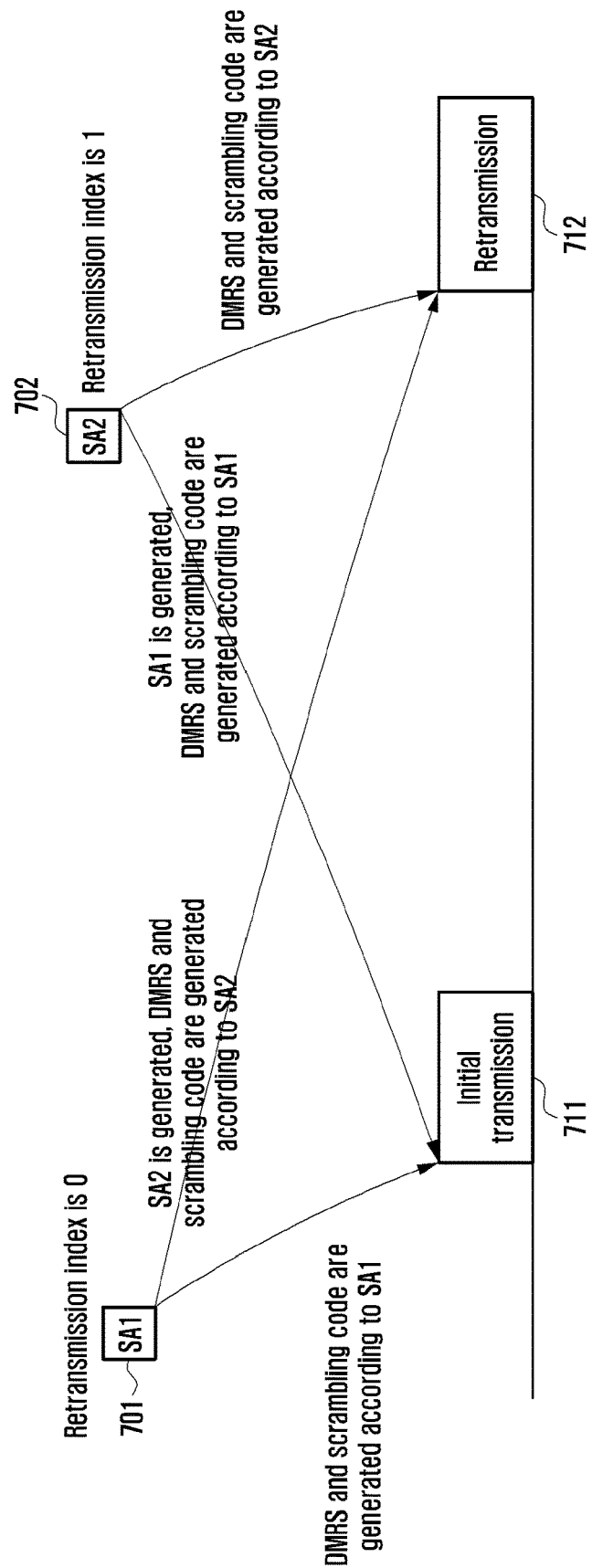

[Fig. 8]
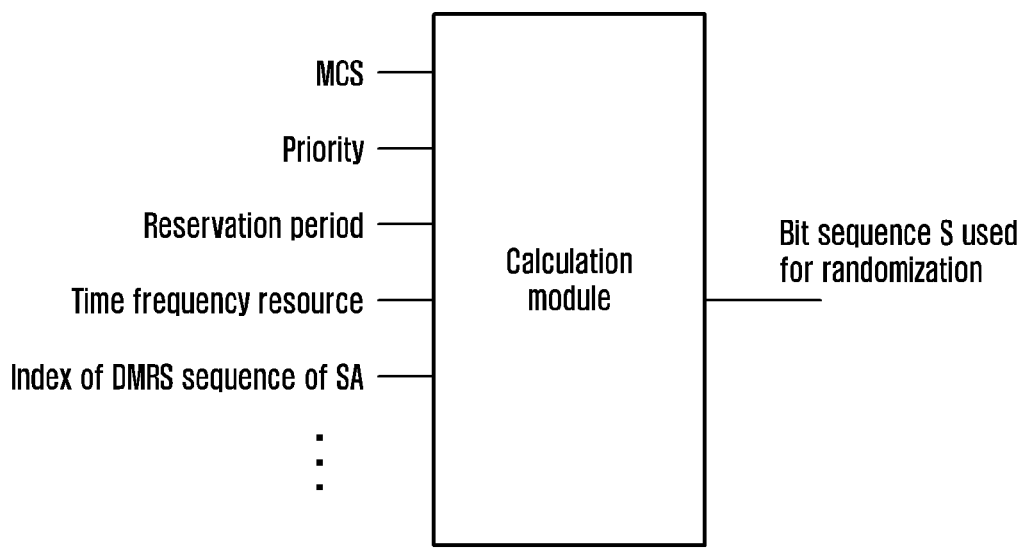
[Fig. 9]
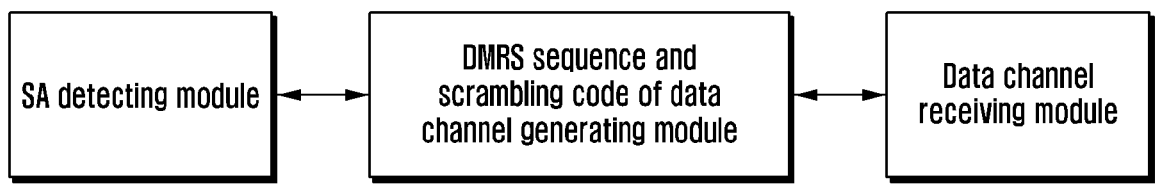

DATA TRANSMITTING METHOD AND APPARATUS

PRIORITY

This application is a National Phase Entry of PCT International Application No. PCT/KR2017/008380 which was filed on Aug. 3, 2017, and claims priority to Chinese Patent Application Nos. 201610727924.0, 201610803897.0 and 201610842911.8, which were filed on Aug. 25, 2016, Sep. 5, 2016 and Sep. 22, 2016, respectively, the content of each of which is incorporated herein by reference.

TECHNICAL FIELD

The present disclosure relates to radio communication system technologies, and more particularly, to a data transmitting method and apparatus in a V2X system.

BACKGROUND ART

At present, with great potential value in public safety fields and general civil communication fields, Device to Device (D2D) communication technology has been accepted by 3GPP standard, and has implemented standardization of partial functions in Rel-12 and Rel-13, which includes mutual discovery among D2D terminals in a In Coverage (IC) scenario, broadcast communication among D2D terminals in a Partial Coverage (PC) scenario and an Out of Coverage (OC) scenario.

At present, in 3GPP Rel-12 standard, two D2D broadcast communication modes are defined, which is referred to as Mode 1 and Mode 2. In Mode 1, it is in demand that a UE performing D2D broadcast communication must be in coverage of a cellular network (i.e., In Coverage UE, ICUE). The UE obtains configuration information of a Physical Sidelink Control Channel (PSCCH) resource pool by receiving system broadcast signaling transmitted from an eNB, wherein the configuration information includes a PSCCH period, a location of a subframe for PSCCH transmission in each period and a location of a physical resource block (PRB) for the PSCCH transmission in each PSCCH period. When the UE supporting broadcast communication of Mode 1 has data, the UE requests a Mode 1 specific communication resource through a specific Buffer Status Report (BSR); afterwards, the UE detects Sidelink Grant from the eNB before each PSCCH period, obtains locations of resources for PSCCH transmission and Physical Sidelink Shared Channel (PSSCH) transmission in the PSCCH period. In Mode 1, through eNB centralized control, resource collision among different UEs can be avoided.

A UE transmitting D2D broadcast communication through Mode 2 may be an ICUE, or may be located out of the coverage of the cellular network (i.e., Out of Coverage UE, OCUE). The ICUE obtains configuration information of a PSCCH resource pool of Mode 2 and configuration information of a corresponding PSSCH resource pool of Mode 2. The PSSCH resource pool includes a location of a subframe for PSSCH transmission in a corresponding PSCCH period, a location of a physical resource block for the PSSCH transmission in each subframe, in each PSCCH period, a transmission resource of a PSCCH and a transmission resource of a corresponding PSSCH are randomly selected; the OCUE determines the configuration information of the PSCCH resource pool of Mode 2 and the configuration information of the corresponding PSSCH resource pool of Mode 2 through pre-configured information, wherein a resource selection way is same as that for ICUE. In a PC scenario, the resource pool configuration of Mode 2 pre-configured for the OCUE is related with a carrier frequency of a cell to which the ICUE belongs, a system bandwidth and/or TDD configuration.

In the two D2D broadcast communication modes above, the PSCCH resource pool is bound one by one with the PSSCH resource pool or the PSSCH resource, in each PSCCH period, the location of the PSCCH resource pool is in front of the related PSSCH resource pool or the related PSSCH resource, which are not overlapped. In addition, each D2D terminal works in a half-duplex mode, which causes that a terminal performing transmission cannot simultaneously receive signal transmitted from the other party. In Rel-12, a device firstly transmits the PSCCH, and then transmits the PSSCH on the resource indicated by the PSCCH. The PSSCH includes information, such as Modulation and Coding Scheme (MCS), time frequency resource allocation information, a Group Destination ID, etc. According to the Group Destination ID carried on the PSCCH, a receiving end determines whether it needs to process the scheduled PSSCH, i.e., the receiving end directly losses the PSSCH corresponding to the Group Destination ID not interested, so as to reduce reception complexity. In each PSCCH period, each PSCCH is transmitted twice, each PSCCH transmission occupies a PRB, and the half-duplex limitation above is solved through a resource hopping way. For example, first transmissions of PSCCHs are within a same subframe, an offset is generated for a location of a subframe of a resource for second transmission, wherein an offset amplitude is related with a location of the resource for the first transmission in a frequency domain, so as to ensure that locations of subframes of retransmission for the PSCCHs are different, wherein the corresponding first transmissions for the PSCCHs are within the same subframe.

FIG. 1 is a schematic diagram illustrating a structure of an uplink subframe in a 3GPP D2D system. For 14 OFDM symbols of a subframe, two OFDM symbols are used for Demodulation Reference Signal (DMRS) transmission, wherein indices of the two OFDM symbols are 3 and 10; the last OFDM symbol in the subframe is fixedly dropped, so as to generate a time period of conversion between transmission and reception for the device, and avoid that a former subframe and a neighbor latter subframe are overlapped with each other because some problems, e.g., transmission time delay, timing advance, etc.; other symbols are used for uplink data transmission. Date may be also transmitted on a first OFDM symbol in the subframe, however, in implementation, this OFDM symbol may be used for Automatic Gain Control (AGC).

Since 3GPP D2D communication is mainly for a low speed UE and a V2X service having a low requirement for delay sensitivity and reception reliability, implemented D2D functions cannot satisfy user requirements, in various subsequent 3GPP releases, each communication UE provider and each communication network equipment provider have a broad consensus to further enhance D2D function architecture at present. Based on existing D2D broadcasting communication architecture, direct communication of low time delay and high reliability between high speed devices, a high speed device and a low speed device, a high speed device and a static device, i.e., Vehicle to Vehicle/Pedestrian/Infrastructure/Network (V2X), is one of functions preferably standardized.

The structure of the uplink subframe as shown in FIG. 1 satisfies a requirement of a main application scenario in D2D, however, for a typical V2X application scenario, e.g., in V2X communication, it is in demand that a highest relative moving speed of the supported UE is 500 km/h, and a carrier frequency can reach 6 GHz, Doppler frequency shift introduced by the high moving speed and the high carrier frequency causes serious interference among carriers, in addition, regarding an impact of a timing offset and a frequency offset between a base station and a UE, the structure of the DMRS cannot satisfy performance requirement. According to current discussion in standardization meetings, an important scheme is as shown in FIG. 2, i.e., the DMRS is transmitted on 4 OFDM symbols, so as to improve a time density of the DMRS, i.e., indices of DMRS symbols are 2, 5, 8 and 10, and to provide a better performance.

According to discussion in current standardization meetings, a solution includes that the collision problem and the in band leakage problem above are solved based on Sensing. It is based on an assumption that a device occupies a resource through SPS, i.e., the resource occupied by the device is periodic in a time period. As shown in FIG. 3, a time when the device selects the PSCCH/PSSCH resource is denoted as a subframe n, the device firstly detects resources in its resource pool from a subframe n−a to a subframe n−b, determines which time frequency resource is occupied and which time frequency resource is idle; and then selects the PSCCH/PSSCH resource in the subframe n, it is denoted that the PSCCH is transmitted in a subframe n+c, the PSSCH is transmitted in a subframe n+d, and a reservation resource is within a subframe n+e; next, the device transmits the PSCCH in the subframe n+c, transmits the PSSCH in the subframe n+d, and transmits a next data on the reservation resource in the subframe n+e. There are two ways for the device above to detect the resources in the resource pool. A way includes obtaining accurate information of channel occupancy for another device by decoding the PSCCH, so as to measure reception power of the corresponding device. Another way is based on detection of energy in the PSSCH resource pool. The former method may obtain accurate information for channel occupancy and channel reservation, however, if the PSCCH is not correctly received, e.g., PSCCHs of multiple devices are collided, the detection based on the PSCCH fails. The latter method includes determining whether the resource is occupied based on whether the detected energy is high or low, so that it is avoided to use the occupied resource as possible.

In 3GPP D2D system, the DMRS sequence of the PSCCH is fixed, i.e., all transmitting ends use a same DMRS sequence. In particular, based on a DMRS generating method in LTE, according to a cell identity (PCID) 510, a root sequence of the DMRS is obtained, and a cyclic shift (CS) of the DMRS is fixed as zero, a Orthogonal Cover Code (OCC) is [1 1]. A scrambling code of scheduling information carried in the PSCCH is also fixed, i.e., all transmitting ends use a same scrambling code sequence. In particular, based on a scrambling code generating method in LTE, the PCID is set as 510, other information, e.g., a time slot index, a UE identifier, etc., are fixed as zero. Based on the method, when two devices transmit SAs in a same PRB, the DMRSs of the two devices are entirely overlapped, which is equivalent to only have one DMRS sequence at a receiving end. Since the terminal density in V2X communication is much higher than that in D2D, a possibility that two or more devices transmit SAs and/or data in a same resource is greatly increased, i.e., a SA resource collision condition. In addition, except the collision above, even though two devices perform data transmission in different frequencies in a same subframe, considering impact of Near-Far Effect, in band leakage interference will reduce reception performance. That is, for a receiving end, energy leaked to another neighbor PRB by neighbor devices may be a same weight as that of signal from remote devices, which may be even stronger. Since the terminal density in V2X communication is much higher than that in D2D, in band leakage interference may be more serious. In 3GPP D2D system, the DMRS sequence and the scrambling code of the PSSCH are generated according to a Group Destination ID carried in the PSCCH, so as to achieve randomization.

DISCLOSURE OF INVENTION

Technical Problem

In V2X system, how to effectively support DMRS sequence randomization and scrambling code randomization of the PSSCH is a problem to be solved.

Solution to Problem

The present disclosure provides a data transmitting method, apparatus and a base station, and further provides a method for generating a DMRS sequence and a scrambling of a data channel, so as to reduce interference of data channels of multiple devices.

In order to implement the purpose above, the present disclosure provides technical solutions as follows:

A data transmitting method includes:
detecting, by a device, Scheduling Assignment (SA), generating a DMRS sequence and a scrambling code of a data channel for the SA correctly decoded;
performing, by the device, processing for the data channel scheduled by the SA correctly decoded according to the DMRS sequence and the scrambling code.

Preferably, the generating the DMRS sequence and the scrambling code of the data channel comprises: generating the DMRS sequence and the scrambling code of the data channel according to information in at least one information field in the SA correctly decoded, and/or an index of a DMRS sequence used for the SA correctly decoded.

Preferably, indices of DMRS sequences used for multiple SAs scheduling a same data are same, or are associated.

Preferably, the information field in the SA includes one or more of the following information:
a part of bits of Modulation and Coding Scheme (MCS);
a priority of a scheduled service;
time frequency resource information;
time information of the time frequency resource information;
frequency information of the time frequency resource information;
information indicating another transmission except a current transmission in the time frequency resource information;
time information indicating another transmission except the current transmission in the time frequency resource information;
frequency information indicating another transmission except the current transmission in the time frequency resource information;

Preferably, one or more of the following operations are performed for the information field in the SA:
setting the information indicating another transmission except the current transmission in the time frequency resource information as a random value;

setting the time information indicating another transmission except the current transmission in the time frequency resource information as a random value;

setting the frequency information indicating another transmission except the current transmission in the time frequency resource information as a random value;

setting a highest bit of the MCS as a random value;

setting a padding bit in an information field in the SA as a random value.

Preferably, set random values comprises that the random values set in multiple SAs scheduling a same data are same, or are associated.

Preferably, the generating the DMRS sequence and the scrambling code of the data channel according to the information in the at least one information field in the SA correctly decoded, and/or an index of the DMRS sequence used for the SA correctly decoded comprises: jointly processing information in the at least one information field in the SA and the index of the DMRS sequence used for the SA, obtaining a bit sequence S, and generating the DMRS sequence and the scrambling code of the data channel according to the sequence S.

Preferably, the bit sequence S obtained through processing comprises:

adding CRC when transmitting the SA; or obtaining CRC through calculation;

obtaining the sequence S according to the CRC.

Preferably, the adding the CRC when transmitting the SA comprises: determining the CRC according to the index of the DMRS sequence used for the SA; adding the determined CRC when transmitting the SA.

Preferably, when the number of bits of the CRC is not equal to 8, 8 bits in the CRC are used to generate the DMRS sequence and the scrambling code of the data channel.

Preferably, the method further includes: generating an 8-bit CRC, used for generating the DMRS sequence and the scrambling code of the data channel.

A data transmitting apparatus includes: a SA detecting module, a DMRS sequence and scrambling code of data channel generating module, and a data channel receiving module, wherein the SA detecting module is configured to detect Scheduling Assignment (SA);

the DMRS sequence and scrambling code of data channel generating module is configured to generate a DMRS sequence and a scrambling code of a data channel for the SA correctly decoded; and the data channel receiving module is configured to perform processing for the data channel scheduled by the SA correctly decoded according to the DMRS sequence and the scrambling code.

Advantageous Effects of Invention

According to the method of the present disclosure, the DMRS sequence randomization and the scrambling code randomization of the data channel can be better supported, so as to optimize transmission performance.

BRIEF DESCRIPTION OF DRAWINGS

FIG. 1 is a schematic diagram illustrating an uplink subframe of an existing LTE system;

FIG. 2 is a schematic diagram illustrating an uplink subframe for DMRS transmission on 4 OFDM symbols;

FIG. 3 is a schematic diagram illustrating channel resource selection/reselection based on detection;

FIG. 4 is a flowchart illustrating a method for processing DMRS sequence randomization and scrambling code randomization of a data channel according to the present disclosure;

FIG. 5 is a schematic diagram illustrating a method for processing DMRS sequence randomization and scrambling code randomization of a data channel according to the present disclosure;

FIG. 6 is a schematic diagram illustrating that a data is transmitted twice, and two SAs are transmitted;

FIG. 7 is a schematic diagram illustrating a method for generating a DMRS sequence and a scrambling code according to a SA according to the present disclosure;

FIG. 8 is a schematic diagram illustrating a method for generating a sequence used for DMRS sequence randomization and scrambling code randomization according to the present disclosure;

FIG. 9 is a schematic diagram illustrating a structure of an apparatus according to the present disclosure.

MODE FOR THE INVENTION

The present disclosure will be described in further detail hereinafter with reference to accompanying drawings and embodiments to make the objective, technical solution and merits therein clearer.

It is assumed that a data transmission mechanism of a device includes that, firstly, the device transmits a control channel, used to indicate information such as a time frequency resource occupied by a data channel and Modulation and Coding Scheme (MCS), which is referred to as Scheduling Assignment (SA); next, the device transmits data in the scheduled data channel. For LTE D2D/V2X system, the SA above is also referred to as PSCCH, and the data channel is also referred to as PSSCH.

In V2X communication, the number of devices in a specific region including vehicles, pedestrians and roadside units (RSU) may be great, and there may be data transmission requirements for the great amount of nodes, which will cause that there is a very large possibility for collision and interference among each other. In general, a V2X data packet usually needs to be transmitted to all UEs around, so as to support road safety, which causes that effect of selecting a data channel and reducing reception complexity cannot be implemented through a Group Destination ID in LTE D2D system. Thus, in a method, the Group Destination ID is not included in SA. However, randomization functions of DMRS sequences and scrambling codes of data channels are still needed for supporting effective data transmission. In LTE system, only when some devices occupy a same data channel, interference of DMRSs of multiple devices needs to be reduced by DMRS sequence randomization.

Device A firstly transmits a SA, which indicates an occupied data channel resource and another parameter used for control data transmission. The parameter above may include one or more of the following parameters:

Modulation and Coding Scheme (MCS) of data transmission, a transmission block size (TBS) may be obtained by combination of the MCS and the number of occupied PRBs;

a priority of a scheduled service, used for resource selection/reselection based on the priority;

a process index of current data, i.e., through configured different process indices, the device A may transmit multiple pieces of data, and it is not limited that a piece of data is not transmitted until both initial transmission and retransmission for a previous piece of data are completed;

time frequency resource information, i.e., to indicate time frequency resources for initial transmission and retransmission of a piece of data.

The parameters above are some exemplary examples, and it is not limited in the present disclosure that the SA only includes the parameters above. In particular, environments for neighbor devices are consistent, service types to be transmitted by the neighbor devices may be also consistent, and the neighbor devices may share a same resource for communication, thus, each information field in the SA may be same, or may be almost same, which limits implementation effect of DMRS sequence randomization and scrambling code randomization based on various pieces of information in the SA. It is assumed that there is no information field specifically used for the DMRS sequence randomization and the scrambling code randomization, or the number of bits of the information field specifically used for the DMRS sequence randomization and scrambling code randomization is small, thus, randomization effects are limited. As shown in FIG. 4, a method for processing DMRS sequence randomization and scrambling code randomization according to the present disclosure is described.

At block 401, the device firstly detects the SA, and then generates a DMRS sequence and a scrambling code of a data channel for the SA correctly decoded.

Information which may be used for the DMRS sequence randomization and the scrambling code randomization includes various information fields carried in the SA. In addition, in order to reduce interference among SAs of multiple devices, the DMRS used for the SA may be randomized. That is, N DMRS sequences are supported, N is more than 1, the N DMRS sequences may be generated by changing one, more or all of parameters of a root sequence, CS and OCC, e.g., 4 DMRS sequences are generated by supporting 4 CSs. When transmitting the SA, the device may randomly select a DMRS sequence used for current SA transmission. According to the method, when two devices transmits SAs on a same resource, DMRS sequences selected by the two devices may be different, so as to improve channel estimation accuracy based on DMRSs. Since an index of the DMRS sequence of the SA currently selected is randomized, the index above may be used for the DMRS sequence randomization and the scrambling code randomization. Especially, the information together with the information field in the SA above may be used for the DMRS sequence randomization and the scrambling code randomization. At a receiving end, detection for the N DMRS sequences is equivalent to obtain $\lceil \log_2(N) \rceil$ bit information. The index of the DMRS sequence of the SA currently detected may be used for the DMRS sequence randomization and the scrambling code randomization.

As shown in FIG. 5, one, more or all of information fields in the SA may be considered, the index of the DMRS sequence used for the SA may be further considered, to obtain the bits used for the DMRS sequence randomization and the scrambling code randomization. When inputted information is changed, the processing method above needs to ensure that the outputted bits used for randomization is also changed. According to the obtained bits used for randomization, the information, e.g., the root sequence, the CS and the OCC of the DMRS sequence of the data channel, may be obtained, and the scrambling code of the data channel is obtained.

In order to avoid that a part of devices cannot receive a piece of data because limitation of a half-duplex operation and to improve link performance by combination of multiple data transmissions, a device may perform K transmissions for a piece of data, K is more than or equal to 1, accordingly, may perform K transmissions for the SA. Each SA includes indication information of time frequency resources for K' transmissions in the K transmissions, wherein K' is less than or equal to K. Thus, even though some SAs are lost, the receiving device may still perform joint decoding for multiple transmissions, and may respectively measure reception power for each data transmission, which is used for resource selection/reselection based on detection.

As shown in FIG. 6, it is assumed that K is equal to K', K=2, both initial transmission (611) and retransmission (612) are scheduled through SA1 (601) and SA2 (602). Since the receiving device may not receive the SA because SA decoding error or a half-duplex reason, the receiving device may loss a SA. For SA1, regarding that the reception device may loss the SA2, the receiving device needs to support reception of the initial transmission and retransmission of the data according to the SA1, i.e., a DMRS sequence and a scrambling code for the initial transmission and a DMRS sequence and a scrambling code for the retransmission may be obtained according to the SA1. For the SA2, regarding that the receiving device may loss the SA1, the receiving device needs to support reception of the retransmission of the data according to the SA2, i.e., the DMRS sequence and the scrambling code of the retransmission may be obtained according to the SA2; or the receiving device needs to support the reception of the initial transmission and retransmission of the data according to the SA2, i.e., the DMRS sequence and the scrambling code of the initial transmission and the DMRS sequence and the scrambling code of the retransmission may be obtained according to the SA2. According to the analysis above, for a transmission, e.g., the retransmission above, it needs to be supported at the same time that the DMRS sequence and the scrambling code are determined according to multiple SAs, i.e., the DMRS sequences and the scrambling codes determined according to the multiple SAs for a same data transmission must be same with each other.

Table. 1 illustrates information fields and the number of bits of the information fields in standardized SA in existing 3GPP. Since a data channel scheduled by the SA is within a subframe same with the SA, a time location of the data channel is not explicitly indicated. In 3GPP, the resource occupied by the SA and a relationship of sub-channels of the data channel scheduled by the SA in the same subframe are defined, thus, a frequency location of the data channel is not explicitly indicated. That is, it is assumed that the SA and scheduled data channel occupy consecutive PRBs, a SA resource occupies two PRBs with a lowest frequency in one or more consecutive sub-channels scheduled by the SA; it is assumed that the SA and the scheduled data channel occupy non-consecutive PRBs, the index of the SA resource and the index of the smallest sub-channel of the data channel scheduled by the SA are same. In table 1, a retransmission index is used to distinguish whether the current SA is used to schedule the initial transmission or the retransmission. The time frequency resource includes a time gap, an interval of subframes occupied by data channels for two transmissions of a piece of data, wherein according to a value of the retransmission index, the time gap is positive when the retransmission index is equal to 0, the time interval is negative when the retransmission index is equal to 1, a frequency resource field which only needs to indicate the number of scheduled sub-channels and an index of an start sub-channel of another data channel scheduled by the SA. In addition, in order to satisfy requirements, e.g., forward compatibility, the SA includes 7 reserved bits, the reserved bits are set as 0.

TABLE 1

Information fields of SA

| Information field | The number of bits |
|---|---|
| Priority | 3 |
| MCS | 5 |
| Reservation period | 4 |
| Retransmission index | 1 |
| Time gap | 4 |
| Frequency resource | 8 |
| Reserved bits | 7 |
| CRC | 16 |
| Total number of bits | 48 |

Since a resource for a transmission of a piece of data may be indicated through multiple SAs, the DMRS sequences and scrambling codes indicated by the multiple SAs for a same transmission are same with each other. DMRS sequences and scrambling codes for K data transmissions of a same piece of data are same, i.e., according to K SAs, same DMRS sequences and same scrambling codes are obtained. Alternatively, the DMRS sequences and the scrambling codes for K data transmissions of a same piece of data may be same or different, thus, for a SA, after processing, the DMRS sequences and the scrambling codes for K data transmissions may be obtained, and according to different SAs, same DMRS sequences and same scrambling codes for a same data transmission may be obtained.

The DMRS sequence and the scrambling code for a transmission may be obtained according to the corresponding SA, e.g., K SAs used for scheduling a piece of data one by one correspond to K transmissions of a piece of the data, information carried in another SA after processing may generate a DMRS sequence and a scrambling code same with the corresponding SA above. For example, the corresponding SA above is generated according to another SA, thus, the same DMRS sequences and the same scrambling codes are generated. When the SA and the data channel scheduled by the SA are within a same subframe, the corresponding SA above and the transmission above is within a same subframe. When the SA and the data channel scheduled by the SA may be respectively within different subframes, it is assumed that the SA indicates a scheduling delay between the SA and the transmission corresponding to the SA, the subframe of the transmission is the subframe of the SA plus the scheduling delay. As shown in FIG. 7, the initial transmission (711) and the retransmission (712) of corresponding data are scheduled through SA1(701) and SA2(702), wherein the SA1 corresponds to the initial transmission, and the SA2 corresponds to the retransmission. The DMRS sequence and the scrambling code of the initial transmission and the DMRS sequence and the scrambling code of the retransmission are respectively obtained according to the SA1 and the SA2. It is assumed that information of the SA2 may be obtained according to the information of the SA1, and the information of the SA1 may be obtained according to the information of the SA2, thus, the DMRS sequence and the scrambling code of the initial transmission and the DMRS sequence and the scrambling code of the retransmission may be respectively obtained according to the SA2 and the SA1. Thus, when losing a SA, the receiving device may obtain the DMRS sequence and the scrambling code of a transmission corresponding to the lost SA according to another SA. For example, the lost SA may be reverted according to another SA, and is used to generate the DMRS sequence and the scrambling code. Alternatively, the DMRS sequence and the scrambling code may be obtained according to a fixedly SA, e.g., a SA corresponding to a first transmission, information carried in another SA after processing needs to generate the DMRS sequence and the scrambling code same as that generated according to the SA of the first transmission, e.g., the SA corresponding to the first transmission is reverted according to another SA, and is used to generate the DMRS sequence and the scrambling code.

For K SAs for scheduling a piece of data, e.g., various information fields in table 1, according to information of a SA, another SA may be obtained. A value of a retransmission index field may be configured according to initial transmission and retransmission accordingly. A frequency resource field indicates the number of scheduled sub-channels and an index of an start sub-channel of another transmission. It is assumed that the SA and the data channel scheduled by the SA are within a same subframe, according to a resource occupied by the SA, an index of an start sub-channel of a transmission corresponding to the SA may be obtained, thus, according to the number of the scheduled sub-channels and the index of the start sub-channel of the transmission corresponding to the SA, the value of the frequency resource field of the SA corresponding to the another transmission may be generated.

When the index of the DMRS sequence used for the SA is used for randomization, in order to ensure that DMRS sequences and scrambling codes respectively determined through multiple SAs for a same transmission are same, the indices of the DMRS sequences used for the multiple SAs above may be same, or the indices of the DMRS sequences used for the multiple SAs above may be associated with each other, i.e., according to an index of a DMRS sequence used for a SA, an index of a DMRS sequence used by another SA may be obtained. Especially, the indices of the DMRS sequences used for K SAs for scheduling a same piece of data may be same or associated.

At block 402, for the SA correctly decoded, according to the DMRS sequence and scrambling code generated in block 401, the device receives the information of the data channel scheduled by the SA, and/or performs measurement for the data channel. The measurement may include measuring reception power of the DMRS of the data channel.

Embodiment 1

According to analysis above, for neighbor devices, various information fields in SAs may be same, or may be almost same, which limits effect of implementing DMRS sequence randomization and scrambling code randomization based on various information fields in the SA. The information used for randomization may be in combination of one, more or all information fields in the SA. In order to improve randomization effect, fields that there is a large possibility of having different values with each other, or fields that there is a large possibility of having a value different with others are selected. Total 8 bits are selected to substitute a group destination ID for randomization; or more than 8 bits are selected, and the selected bits are further processed as 8 bits, so as to substitute the group destination ID for randomization; or when the selected bits are more than 8 bits, directly according to the selected bits, a method for generating a DMRS sequence and a scrambling code is defined accordingly. Considering that the device may perform K transmissions for a piece of data, and perform K transmissions for SAs accordingly, according to the multiple SAs, the DMRS sequences and scrambling codes respectively determined according to the multiple SAs for a same data transmission must be same.

For MCS, it is assumed that the data channel does not support all values of MCS, e.g., only a modulation Scheme corresponding to QPSK is supported, bits which may be changed is extracted according to a value of MCS which may be used. It is taken as an example that only the QPSK is supported, available MCS indices are 0~9, i.e., only last 4 bits of the MCS may be changed, thus, the last 4 bits or a subset of the last 4 bits are selected for randomization.

For a priority of a scheduled service, when the neighbor devices transmit services with a same service priority, there is no randomization effect. However, when the information field is used, DMRS sequence randomization and the scrambling code randomization for services with different priorities is ensured, so as to ensure data transmission with a high priority.

For time frequency resource information, time resource information and frequency resource information may be respectively indicated in different fields. A time resource refers to a subframe of an allocated resource. An allocation granularity of a frequency resource may be a sub-channel, and the sub-channel may include one or more PRBs. A resource may include one or more sub-channels. A timing relation depending on the SA and the data channel, and a time frequency resource indicating method are respectively described below.

It is assumed that the SA and the data channel scheduled by the SA are within a same subframe. It is assumed that a piece of data is transmitted only once. When the data channels occupied by different devices are entirely same, time frequency resource indication information of the devices in the SAs may be same, thus, there is no randomization effect for the time frequency resources in this condition.

It is assumed that the SA and the data channel scheduled by the SA are respectively in different subframes, i.e., a condition that values of c and d are different in a method as shown in FIG. 3. It is assumed that a piece of data is only transmitted once, when data channels occupied by different devices are entirely same with each other, the time frequency resource indication information of the devices in the SAs may be still different, e.g., time delays between SAs and the data channels of the two devices, i.e., d–c, are different. That is, the randomization may be implemented according to the time information of the time frequency resource information.

Actually, in order to avoid that a part of devices cannot receive a piece of data because a limitation of a half-duplex operation, the device may perform multiple transmissions for a piece of data, and may perform multiple transmissions for the SA, where the SA includes the time frequency resource indication information for the multiple data transmissions. In order to randomize resource selection and avoid collision, multiple time frequency resources for the multiple transmissions for a piece of data are randomized, i.e., even though the two devices respectively perform a data transmission on a same time frequency resource, the time frequency resources for another transmission of the same piece of data of the two devices may be different. Thus, in this condition, the randomization may be implemented by using information indicating another transmission except the current transmission in the time frequency resource information above. For example, the information for another transmission except the current transmission may be a subframe of another transmission, a time gap of another transmission relative to the current transmission, and/or an index of an start sub-channel of another transmission, etc. If time frequency resources for multiple transmissions of a piece of data are respectively indicated, time resource information and frequency resource information of another transmission except the current transmission indicated above may be directly obtained. If joint encoding is used for the time frequency resources of multiple transmissions of a piece of data, the time resource information of another transmission except the current transmission indicated above is extracted according to the time resource information jointly encoded, the frequency resource information of another transmission except the current transmission indicated above is extracted according to the frequency resource information jointly encoded; or randomization is performed directly by using the time resource information jointly encoded and/or the frequency resource information jointly encoded. When the randomization is performed, only the time resource information in the time frequency information may be used, only the frequency resource information in the time frequency information may be used, or the entire time frequency resource information is used.

The index of the DMRS sequence used for the SA is randomized, which may be used for the DMRS sequence randomization and the scrambling coding randomization. Especially, the information together with the information field in the SA may be used for the DMRS sequence randomization and the scrambling coding randomization. For example, it is assumed that there are 4 optional DMRS sequences of the SA, which are equivalent to 2-bit information, thus, it only needs to select 6 bits in the information field of the SA above, so as to obtain the total 8 bits and substitute the group destination ID for the DMRS sequence randomization and the scrambling coding randomization.

In addition, in order to ensure that the number of bits of the SA is fixed, some information fields may be not in demand in some conditions, however, still needs to occupy some bits. For example, it is assumed that the SA and the data channel scheduled by the SA are within a same subframe, and it is assumed that a piece of data is only transmitted once, the time frequency resource occupied for multiple transmissions does not need to be indicated, at this time, the time frequency resource information of another transmission except the current transmission may be randomly set, thus, randomization may be implemented according to the time frequency resource information of another transmission except the current transmission. For example, it is assumed that the time frequency resources for multiple transmissions of a piece of data are respectively indicated in the SA, the time frequency information of another transmission except the current transmission may be directly set as random bits, which is used for effective randomization. If the time frequency resources of multiple transmissions are jointly coded, the information of another transmission except the current transmission in a field jointly coded is randomly set, and is used for effective randomization. Only time resource information of another transmission may be set as the random value; or only frequency resource information of another transmission may be set as the random value, e.g., the index of the start sub-channel for another transmission in the frequency resource field in table 1 may be set as the random value; or both the time resource information and the frequency resource information of another transmission are set as random values.

In addition, for MCS, it is assumed that only the QPSK is supported, and MCS0~9 are indicated, the highest bit of MCS is unused, this bit may be randomly set, and is used to support effective randomization. In order to ensure that the DMRS sequences and the scrambling codes determined through the multiple SAs for a same transmission are same, the highest bit of the MCS in the multiple SAs may be set as a same random value or an associated random value. The "associated" above includes that according to the highest bit of the MCS of a SA, the highest bit of the MCS of another SA may be obtained. Especially, the highest bits of the MCS in K SAs for scheduling a piece of data may be set as a same random value or an associated random value.

In addition, in the SA, if there is a padding bit, e.g., the padding bit is added in order to achieve the specific number of bits or in order to be consistent with the number of bits of another DCI format, the padding bit may be set as a random value, and is used to support effect random value. it is assumed that a piece of data is transmitted twice, the frequency resource field may indicate the number of scheduled sub-channels and the index of the start sub-channel of another transmission, the frequency resource field may be fixedly occupy N bits, e.g., N is equal to 8. In addition, according to the number of the sub-channels k configured by a high layer, the number of bits of the number of the scheduled sub-channels and the index of the start sub-channel of another transmission actually to be indicated is $ceil(\log_2(k(k+1)/2))$. For example, it is assumed that a maximum value of the number of the sub-channels is 20, the number of the bits actually required may be changed from 0 to 8. Thus, $ceil(\log_2(k(k+1)/2))$ of the frequency information field indicates valid frequency resource information, In order to ensure fixed N bits, $N-ceil(\log_2(k(k+1)/2))$ padding bits may be set as random values, i.e., there are $2^{N-ceil(\log_2(k(k+1)/2))}$ different random values, which is used to support effective randomization. In order to ensure that the DMRS sequences and the scrambling codes determined by multiple SAs for a same transmission are same, the padding bits used for DMRS sequence randomization and scrambling code randomization in the multiple SAs may be set as a same random value, or as associated random values. The "associated" above includes that according to the padding bits in a SA, the padding bits in another SA may be obtained. Especially, the padding bits used for the DMRS sequence randomization and the scrambling code randomization in K SAs for scheduling a same piece of data are entirely set as a same random value or associated random values.

It is assumed that the frequency resource field above, i.e., the number of the scheduled sub-channels and the index of the start sub-channel of another transmission, is used to generate the DMRS sequence and the scrambling code. For a SA, the field may be directly used to generate the DMRS sequence and the scrambling code for a transmission corresponding to the SA. When the DMRS sequence and the scrambling code for another transmission needs to be generated according to the SA, the frequency resource information field of the another transmission above is generated according to the number of the scheduled sub-channels and the index of the start sub-channel of the transmission corresponding to the SA, and is used to generate the DMRS sequence and the scrambling code.

Embodiment 2

According to analysis above, for neighbor devices above, various information fields in a SA may be same or entirely same, which limits effect of implementing DMRS sequence randomization and scrambling code randomization based on various pieces of information in the SA. As shown in FIG. 8, one, more or all information fields in the SA may be jointly considered, or the index of the DMRS sequence used for the SA above may be further considered, a bit sequence S used for the DMRS sequence randomization and the scrambling code randomization is obtained through processing, thus, the DMRS sequence and the scrambling code of the data channel are generated according to the sequence S. When inputted information is changed, the processing method above needs to ensure the outputted bit sequence S is also changed. The sequence S may be obtained by CRC calculation.

In order to transmit information of the SA, firstly, CRC is calculated for various information fields of the SA, and then an operation such as performing channel encoding is performed for the information of the SA and the CRC together. The index of the DMRS sequence used for the SA may be not considered for the CRC above, and the CRC is obtained by calculation based on the various information fields of the SA; or although the index of the DMRS sequence used for the SA is not an information field of the SA, the index of the DMRS sequence used for the SA is included when the CRC is calculated. Thus, when performing decoding for the SA, the receiving device performs check for the DMRS sequence according to the CRC. In LTE system, the CRC above is 16 bits. A value of the CRC depends on all information fields of the SA, i.e., once a bit is changed, regardless of a location of the changed bit, the CRC is changed. The CRC can effectively reflect difference of SA information of different devices, thus, the CRC above may be used for DMRS sequence randomization and the scrambling code randomization. However, when multiple bits are changed, and the changed bits are consistent with a generating polynomial of the CRC, a same value of the CRC may be obtained, however, a possibility that this condition occurs is small. In LTE D2D system, the group destination ID only has 8 bits, but the CRC has 16 bits, the 16-bit CRC may be further processed as 8 bits, so as to substitute the group destination ID for randomization, it is not limited in the present disclosure to use a method to process it as 8 bit. For example, only a part of bits in the CRC above is selected, e.g., last 8 bits is used to substitute the group destination ID for randomization. Alternatively, a method for generating a DMRS sequence and a scrambling code is defined directly according to 16-bit CRC. For example, the 16-bit CRC is denoted as X, a bit of X X mod 2 is used to determine OCC of the DMRS. Additional 3 bits $\lfloor X/2 \rfloor$ mod 8 is used to determine CS of the DMRS, and other bits $\lfloor X/16 \rfloor$ is used to obtain an offset parameter $f_{ss}=\lfloor X/16 \rfloor$ mod 30, and $f_{ss}$ is used to determine a root sequence of the DMRS. For example, the 16-bit CRC is directly used to substitute the group destination ID to generate the scrambling code.

According to the method, the CRC is calculated according to all information fields of the SA. For various information fields in table 1, according to information of a SA, information of another SA may be obtained. If another information needs to be indicated in the SA and if only according to above another information of a SA, above another information of another SA may be obtained, the DMRS sequences and the scrambling codes for multiple transmissions of a piece of data may be generated according to a SA. However, in a condition that the SA and the data channel scheduled by the SA are within different subframes, it is assumed that the scheduling delay between the SA and a transmission corresponding to the SA are indicated in the SA, and it is further assumed that the scheduling delay for each SA is randomly selected, which causes that according to a SA, a scheduling delay of another SA is not obtained, i.e., by using the CRC used for SA transmission, according to a SA, the DMRS sequences and the scrambling codes of multiple transmissions corresponding to a piece of data cannot be generated.

Except for directly using the 16-bit CRC added for SA information transmission for randomization, another CRC is additionally calculated for randomization. The additionally-calculated CRC is not used for the SA information transmission, is only used to substitute the group destination ID for the DMRS sequence randomization and the scrambling code randomization. Entire information of the SA may be used to CRC calculation, or only a part of the information of the SA is selected to CRC calculation. The index of the DMRS sequence used for the SA may be further included in the CRC calculation. Especially, it is assumed that the 16-bit CRC added for SA information transmission is obtained only based on various information fields of the SA, in order to implement randomization, the 16-bit CRC is calculated based on various information fields of the SA and the index of the DMRS sequence used for the SA above. The generating polynomial of the 16-bit CRC may be same or different. When the number of bits of the calculated CRC is not 8, according to the method above, the CRC is further processed as 8 bits, so as to substitute the group destination ID for randomization, e.g., only a part of bits in the CRC is selected, e.g., last 8 bits, to substitute the group destination ID for randomization; or, directly according to the calculated CRC, a method for generating a DMRS sequence and a scrambling code is defined. For example, the calculated CRC is denoted as X, a bit of X X mod 2 is used to determine OCC of the DMRS, additional 3 bits $\lfloor X/2 \rfloor$ mod 8 is used to determine CS of the DMRS, other bits $\lfloor X/16 \rfloor$ is used to determine an offset parameter $f_{ss}=\lfloor X/16 \rfloor$ mod 30, and $f_{ss}$ is used to determine a root sequence of the DMRS. For example, the CRC calculated above directly substitutes the group destination ID to generate the scrambling code. Especially, the number of bits of the additionally-calculated CRC may be 8, so that it is consistent with the group destination ID, and can directly substitute the group destination ID used for DMRS sequence randomization and the scrambling randomization. For example, the generating polynomial of the 8-bit CRC may be a generating polynomial of processing CQI encoding in LTE system.

According to the method, only when the CRC is calculated based on a part of information fields of the SA, information fields used to calculate the CRC may be a part or all of fields satisfying the following conditions, i.e., for an information field, according to the information of a SA, a value of a same information field of another SA may be obtained. For example, various information fields may be applicable in table 1. For a condition that the SA and the data channel scheduled by the SA are within different subframes, it is assumed that the scheduling delay between the SA and a transmission corresponding to the SA is indicated in the SA, and it is further assumed that the scheduling delay is randomly selected for each SA. Since according to a SA, a value of a scheduling delay field of another SA is not obtained, the scheduling delay field above may not be used for CRC calculation. Optionally, for the information field selected for calculating the CRC in the SA, an order of corresponding fields in the SA may be still maintained. Optionally, all information fields and the order of the information fields in the SA are maintained, however, for a field not used for the CRC calculation, the same number of bits of the field may be still occupied, but the value of the bits are set as a fixed value, e.g., all zero bits.

Actually, the CRC calculation is only an information processing method. It is not limited in the present disclosure to use another method, according to one, more or all of information fields in the SA, the index of the DMRS sequence used for the SA, a bit sequence S obtained by processing and used for the DMRS sequence randomization and the scrambling code randomization may be further included.

In addition, since the DMRS sequence used for the SA above is randomly selected, the index of the DMRS sequence used for the SA is a good randomization information. Alternatively, when the bit sequence S is generated, the index of the DMRS sequence used for the SA is not considered, but the DMRS sequence randomization and the scrambling code randomization is processed by using bits of the sequence S and the index of the DMRS sequence used for the SA above. The sequence S may be CRC obtained through calculation, e.g., the CRC obtained by using the method above of the present disclosure. For example, different scrambling codes are respectively defined for the DMRS sequence used for the SA, firstly, according to one, more or all of information fields of the SA, the CRC is calculated, and then the CRC is scrambled by using the scrambling code corresponding to the DMRS sequence used for the current SA, and a sequence obtained through scrambling is used to process the DMRS sequence randomization and the scrambling code randomization. The scrambling operation above may include bits of the CRC respectively plus corresponding bits of the scrambling code, and then module 2. When a length of a scrambling code sequence is less than a length of the CRC, only a part of bits of the CRC is scrambled. For example, firstly, the CRC is calculated according to one, more or all of information fields of the SA, and then the CRC above is scrambled by using bits of the index of the DMRS sequence used for the current SA, a sequence obtained by scrambling is used to process the DMRS sequence randomization and the scrambling code randomization. Since the number of bits of the DMRS sequence used for the SA is usually less than the length of the CRC, the number of the bits of the DMRS sequence used for the SA is denoted as L, a part of the bits of the CRC, e.g., last L bits or first L bits, may be scrambled. It is assumed that according to the generating polynomial of the SA, the CRC is obtained by calculation based on entire information of the SA, when the SA is transmitted, an operation, e.g., performing channel encoding, is performed after the CRC is added to the information of the SA, so as to transmit the SA; alternatively, an operation, e.g., performing channel endcoding, is performed after the sequence above obtained after scrambling is added to the information of the SA.

Corresponding to the method above, the present disclosure further provides an apparatus, and the apparatus may be used to implement the method above. As shown in FIG. 9, the apparatus includes a SA detecting module, a DMRS sequence and scrambling code of data channel generating module, and a data channel receiving module.

The SA detecting module is configured to detect Scheduling Assignment (SA) from another device, and further includes firstly detecting a DMRS occupied by a channel of a SA, and performing channel estimation and decoding for the SA.

The DMRS sequence and scrambling code of data channel generating module is configured to according to the method of the present disclosure, obtain bits used for DMRS sequence randomization and scrambling code randomization through processing according to one, more, or all of information fields in the SA and further according to the index of the DMRS sequence used for the SA.

The data channel receiving module is configured to generate a DMRS sequence and a scrambling code, receive information of a data channel scheduled by the SA and/or perform measurement for the data channel.

Those ordinary skilled in the art will be appreciated that all or part of the steps in the above-described embodiments may be accomplished by a program instructing relevant hardware, wherein the program may be stored in a computer readable storage medium, when being executed, the program includes one or combination of the steps in method embodiments.

In addition, according to some embodiments of the present disclosure, various function modules may be integrated into a processing entity, or may independently exist in physical, or two or more modules may be integrated into a module. The integrated module above can be implemented through hardware, or can be implemented through a software functional module. When the integrated module is implemented through the software functional module, and is sold or used as an independent product, the integrated module may be stored in a computer readable storage medium.

The mentioned storage medium may be a read-only memory, magnetic disk or optical disk.

The foregoing is only preferred examples of the present disclosure and is not used to limit the protection scope of the present invention. Any modification, equivalent substitution and improvement without departing from the spirit and principle of the present disclosure are within the protection scope of the present invention.

The invention claimed is:

1. A method for transmitting data in a wireless communication system, the method comprising:
   identifying scheduling assignment information for transmitting the data;
   identifying cyclic redundancy check (CRC) information based on the scheduling assignment information;
   transmitting the scheduling assignment information and the CRC information on a physical sidelink control channel (PSCCH) to a terminal in a first subframe; and
   transmitting the data and a demodulation reference signal (DMRS) for the data on a physical sidelink shared channel (PSSCH) to the terminal in the first subframe,
   wherein the scheduling assignment information includes resource information for the data and modulation and coding scheme information for the data,
   wherein the CRC information being 16 bits is determined based on all information fields in the scheduling assignment information, and
   wherein the data, a parameter $f_{SS}$ for a root sequence of the DMRS, an orthogonal cover code (OCC) for the DMRS, and a cyclic shift (CS) for the DMRS are identified based on the CRC information, in case that the scheduling assignment information, the data and the DMRS are transmitted in the same subframe.

2. The method of claim 1, wherein the parameter $f_{SS}$ for the root sequence of the DMRS is determined based on: $f_{ss}=\lfloor X/16 \rfloor$ mod 30, where X is the CRC information.

3. The method of claim 1, wherein the OCC for the DMRS is determined based on a value X mod 2, where X is the CRC information.

4. The method of claim 1, wherein the CS for the DMRS is determined based on a value $\lfloor X/2 \rfloor$ mod 8, where X is the CRC information.

5. The method of claim 1, wherein a scrambling code for the data is based on the CRC information.

6. A first terminal for transmitting data in a wireless communication system, the first terminal comprising:
   a transceiver; and
   a controller coupled to the transceiver and configured to:
   identify scheduling assignment information for transmitting the data,
   identify cyclic redundancy check (CRC) information based on the scheduling assignment information,
   transmit the scheduling assignment information and the CRC information on a physical sidelink control channel (PSCCH) to a second terminal in a first subframe, and
   transmit the data and a demodulation reference signal (DMRS) for the data on a physical sidelink shared channel (PSSCH) to the second terminal in the first subframe,
   wherein the scheduling assignment information includes resource information for the data and modulation and coding scheme information for the data,
   wherein the CRC information being 16 bits is determined based on all information fields in the scheduling assignment information, and
   wherein the data, a parameter $f_{SS}$ for a root sequence of the DMRS, an orthogonal cover code (OCC) for the DMRS, and a cyclic shift (CS) for the DMRS are identified based on the CRC information, in case that the scheduling assignment information, the data and the DMRS are transmitted in the same subframe.

7. The first terminal of claim 6,
   wherein the parameter $f_{SS}$ for the root sequence of the DMRS is determined based on:
   $f_{ss}=\lfloor X/16 \rfloor$ mod 30, where X is the CRC information.

8. The first terminal of claim 6,
   wherein the OCC for the DMRS is determined based on a value X mod 2, where X is the CRC information.

9. The first terminal of claim 6,
   wherein the CS for the DMRS is determined based on a value $\lfloor X/2 \rfloor$ mod 8, where X is the CRC information.

10. The first terminal of claim 6,
    wherein a scrambling code for the data is based on the CRC information.

11. A method for receiving data in a wireless communication system, the method comprising:
    receiving scheduling assignment information and cyclic redundancy check (CRC) information on a physical sidelink control channel (PSCCH) from a terminal in a first subframe;
    identifying a demodulation reference signal (DMRS) sequence based on the CRC information; and
    receiving the data and a DMRS for the data on a physical sidelink shared channel (PSSCH) from the terminal according to the scheduling assignment information and the DMRS sequence in the first subframe,
    wherein the scheduling assignment information includes resource information for the data and modulation and coding scheme information for the data,
    wherein the CRC information being 16 bits depends on all information fields in the scheduling assignment information, and
    wherein a parameter $f_{SS}$ for a root sequence of the DMRS sequence, an orthogonal cover code (OCC) for the DMRS sequence, and a cyclic shift (CS) for the DMRS sequence are identified based on the CRC information, in case that the scheduling assignment information, the data and the DMRS are received in the same subframe.

12. The method of claim 11,
wherein the parameter $f_{SS}$ for root sequence of the DMRS is determined based on:
$f_{ss} = \lfloor X/16 \rfloor$ mod 30, where X is the CRC information.

13. The method of claim 11,
wherein the OCC for the DMRS sequence is determined based on a value X mod 2, where X is the CRC information.

14. The method of claim 11,
wherein the CS for the DMRS sequence is determined based on a value $\lfloor X/2 \rfloor$ mod 8, where X is the CRC information.

15. The method of claim 11,
wherein a scrambling code for the data is based on the CRC information.

16. A second terminal for receiving data in a wireless communication system, the second terminal comprising:
a transceiver; and
a controller coupled to the transceiver and configured to:
receive scheduling assignment information and cyclic redundancy check (CRC) information on a physical sidelink control channel (PSCCH) from a first terminal in a first subframe,
identifying a demodulation reference signal (DMRS) sequence based on the CRC information, and
receive the data and a DMRS for the data on a physical sidelink shared channel (PSSCH) from the first terminal according to the scheduling assignment information and the DMRS sequence in the first subframe,
wherein the scheduling assignment information includes resource information for the data and modulation and coding scheme information for the data,
wherein the CRC information being 16 bits depends on all information fields in the scheduling assignment information, and
wherein a parameter $f_{SS}$ for a root sequence of the DMRS sequence, an orthogonal cover code (OCC) for the DMRS sequence, and a cyclic shift (CS) for the DMRS sequence are identified based on the CRC information, in case that the scheduling assignment information, the data and the DMRS is received in the same subframe.

17. The second terminal of claim 16,
wherein the parameter $f_{SS}$ for root sequence of the DMRS is determined based on:
$f_{ss} = \lfloor X/16 \rfloor$ mod 30, where X is the CRC information.

18. The second terminal of claim 16,
wherein the OCC for the DMRS sequence is determined based on a value X mod 2, where X is the CRC information.

19. The second terminal of claim 16,
wherein the CS for the DMRS sequence is determined based on a value $\lfloor X/2 \rfloor$ mod 8, where X is the CRC information.

20. The second terminal of claim 16,
wherein a scrambling code for the data is based on the CRC information.

* * * * *